US007887103B2

(12) United States Patent  (10) Patent No.: US 7,887,103 B2
Evans et al.  (45) Date of Patent: Feb. 15, 2011

(54) ENERGIZING SEAL FOR EXPANDABLE CONNECTIONS

(75) Inventors: Merle E. Evans, Spring, TX (US); Ghazi J. Hashem, Houston, TX (US); John Richard Setterberg, Jr., Huntsville, TX (US); Robert P. Badrak, Sugar Land, TX (US); Patrick G. Maguire, Cypress, TX (US)

(73) Assignee: Watherford/Lamb, Inc., Houston, TX (US)

( * ) Notice: Subject to any disclaimer, the term of this patent is extended or adjusted under 35 U.S.C. 154(b) by 539 days.

(21) Appl. No.: 11/672,180

(22) Filed: Feb. 7, 2007

(65) Prior Publication Data
US 2007/0164565 A1 Jul. 19, 2007

Related U.S. Application Data

(63) Continuation-in-part of application No. 10/848,544, filed on May 18, 2004.

(60) Provisional application No. 60/772,364, filed on Feb. 10, 2006.

(30) Foreign Application Priority Data
May 22, 2003 (GB) ................................. 0311721.5

(51) Int. Cl.
*F16L 25/00* (2006.01)
(52) U.S. Cl. ........................ 285/333; 285/334; 285/355; 285/382.4; 285/382.5
(58) Field of Classification Search ......... 285/333–334, 285/355, 382.4, 382.5, 390
See application file for complete search history.

(56) References Cited

U.S. PATENT DOCUMENTS

| 268,868 A | 12/1882 | Collins |
| 782,349 A | 2/1905 | Marshall |
| 1,678,640 A | 7/1928 | Hall |
| 1,820,644 A | 8/1931 | Bach |

(Continued)

FOREIGN PATENT DOCUMENTS

DE  3413792  11/1985

(Continued)

OTHER PUBLICATIONS

GB Search Report, Application No. 0702526.5, Dated Apr. 25, 2007.

(Continued)

*Primary Examiner*—Aaron Dunwoody
*Assistant Examiner*—Fannie Kee
(74) *Attorney, Agent, or Firm*—Patterson & Sheridan, L.L.P.

(57) ABSTRACT

A tubular configured to mate with a second tubular so that sealing integrity is maintained between the tubulars before, during, and after expansion of the tubulars is disclosed. In one embodiment, a connector for connecting tubulars is provided. The connector includes a pin portion; a box portion, wherein the pin and the box portions are configured to mate; a sealing surface formed in an inner surface of the box portion; a seal disposed in a groove formed in an outer surface of the pin portion, wherein the seal is configured to engage with a sealing surface of the box portion upon mating of the pin and the box portions; and a bump formed on an inner surface of the pin portion, wherein the bump is substantially radially aligned with the groove and the bump is configured so that the seal remains engaged with the box portion during and after expansion of the pin and the box portions.

36 Claims, 6 Drawing Sheets

U.S. PATENT DOCUMENTS

| | | | |
|---|---|---|---|
| 2,155,370 A | 4/1939 | Hall et al. | |
| 2,217,370 A | 10/1940 | Johnston | |
| 2,226,804 A | 12/1940 | Carroll | |
| 2,341,670 A | 2/1944 | Stinson | |
| 2,407,552 A | 9/1946 | Hoesel | |
| 2,751,238 A | 6/1956 | Vegren | |
| 2,858,894 A | 11/1958 | Akeyson | |
| 2,873,985 A | 2/1959 | Baldwin, Jr. | |
| 2,898,136 A | 8/1959 | Hall, Sr. et al. | |
| 3,062,568 A | 11/1962 | Andresen et al. | |
| 3,105,556 A | 10/1963 | Raulins | |
| 3,353,599 A | 11/1967 | Swift | |
| 3,419,079 A | 12/1968 | Current | |
| 3,759,553 A | 9/1973 | Carter | |
| 3,766,991 A | 10/1973 | Brown | |
| 3,851,983 A | 12/1974 | MacKenzie | |
| 3,855,126 A | 12/1974 | Smith | |
| 3,857,450 A | 12/1974 | Guier | |
| 3,913,687 A | 10/1975 | Gyongyosi et al. | |
| 3,989,284 A | 11/1976 | Blose | |
| 4,076,280 A | 2/1978 | Young | |
| 4,140,337 A | 2/1979 | Arcella et al. | |
| 4,281,858 A | 8/1981 | Bowyer | |
| 4,423,889 A | 1/1984 | Weise | |
| 4,433,862 A * | 2/1984 | Raulins et al. | 285/350 |
| 4,449,596 A | 5/1984 | Boyadjieff | |
| 4,491,351 A | 1/1985 | Galle, Jr. et al. | |
| 4,550,937 A | 11/1985 | Duret | |
| 4,591,195 A | 5/1986 | Chelette et al. | |
| 4,601,492 A | 7/1986 | George | |
| 4,611,838 A | 9/1986 | Heilmann et al. | |
| 4,619,472 A | 10/1986 | Kozono et al. | |
| 4,625,796 A | 12/1986 | Boyadjieff | |
| 4,659,119 A | 4/1987 | Reimert | |
| 4,671,544 A | 6/1987 | Ortloff | |
| 4,703,954 A * | 11/1987 | Ortloff et al. | 285/115 |
| 4,703,959 A | 11/1987 | Reeves et al. | |
| 4,711,474 A | 12/1987 | Patrick | |
| 4,712,955 A | 12/1987 | Reece et al. | |
| 4,753,460 A | 6/1988 | Tung | |
| 4,754,807 A | 7/1988 | Lange | |
| 4,771,829 A | 9/1988 | Sparlin | |
| 4,778,008 A | 10/1988 | Gonzalez et al. | |
| 4,786,090 A | 11/1988 | Mott | |
| 4,793,422 A | 12/1988 | Krasnov | |
| 4,813,493 A | 3/1989 | Shaw et al. | |
| 4,822,081 A | 4/1989 | Blose | |
| 4,878,546 A | 11/1989 | Shaw et al. | |
| 4,892,337 A | 1/1990 | Gunderson et al. | |
| 4,917,409 A | 4/1990 | Reeves | |
| 4,985,975 A | 1/1991 | Austin et al. | |
| 5,015,017 A | 5/1991 | Geary | |
| 5,048,871 A | 9/1991 | Pfeiffer et al. | |
| 5,066,052 A * | 11/1991 | Read | 285/334 |
| 5,069,761 A | 12/1991 | Krings et al. | |
| 5,098,241 A | 3/1992 | Aldridge et al. | |
| 5,181,570 A | 1/1993 | Allwin et al. | |
| 5,251,709 A | 10/1993 | Richardson | |
| 5,339,895 A | 8/1994 | Arterbury et al. | |
| 5,348,095 A | 9/1994 | Worrall et al. | |
| 5,350,202 A | 9/1994 | Fritz et al. | |
| 5,360,240 A | 11/1994 | Mott | |
| 5,366,012 A | 11/1994 | Lohbeck | |
| 5,388,651 A | 2/1995 | Berry | |
| 5,415,442 A | 5/1995 | Klementich | |
| 5,480,196 A | 1/1996 | Adams, Jr. | |
| 5,518,072 A | 5/1996 | McTernaghan | |
| 5,520,422 A | 5/1996 | Friedrich et al. | |
| 5,667,011 A | 9/1997 | Gill et al. | |
| 5,743,333 A | 4/1998 | Willauer et al. | |
| 5,782,503 A | 7/1998 | Noel et al. | |
| 5,787,980 A | 8/1998 | Sparlin et al. | |
| 5,810,401 A | 9/1998 | Mosing et al. | |
| 5,855,242 A | 1/1999 | Johnson | |
| 5,901,789 A | 5/1999 | Donnelly et al. | |
| 5,906,398 A | 5/1999 | Larsen et al. | |
| 5,924,745 A | 7/1999 | Campbell | |
| 5,971,443 A | 10/1999 | Noel et al. | |
| 5,984,568 A | 11/1999 | Lohbeck | |
| 6,012,522 A | 1/2000 | Donnelly et al. | |
| 6,109,349 A | 8/2000 | Simone et al. | |
| 6,142,230 A | 11/2000 | Smalley et al. | |
| 6,158,507 A | 12/2000 | Rouse et al. | |
| 6,158,785 A | 12/2000 | Beaulier et al. | |
| 6,189,619 B1 | 2/2001 | Wyatt et al. | |
| 6,203,766 B1 | 3/2001 | Kawakami et al. | |
| 6,270,127 B1 | 8/2001 | Enderle | |
| 6,273,634 B1 | 8/2001 | Lohbeck | |
| 6,315,040 B1 | 11/2001 | Donnelly | |
| 6,322,109 B1 | 11/2001 | Campbell et al. | |
| 6,322,110 B1 | 11/2001 | Banker et al. | |
| 6,325,424 B1 | 12/2001 | Metcalfe et al. | |
| 6,343,813 B1 | 2/2002 | Olson et al. | |
| 6,409,175 B1 | 6/2002 | Evans et al. | |
| 6,454,013 B1 | 9/2002 | Metcalfe | |
| 6,457,532 B1 | 10/2002 | Simpson | |
| 6,457,537 B1 | 10/2002 | Mercer et al. | |
| 6,478,092 B2 | 11/2002 | Voll et al. | |
| 6,481,760 B1 | 11/2002 | Noel et al. | |
| 6,543,816 B1 | 4/2003 | Noel | |
| 6,554,287 B1 | 4/2003 | Sivley, IV et al. | |
| 6,581,980 B1 | 6/2003 | DeLange et al. | |
| 6,607,220 B2 | 8/2003 | Sivley, IV | |
| 6,619,696 B2 | 9/2003 | Baugh et al. | |
| 6,622,797 B2 | 9/2003 | Sivley, IV | |
| 6,623,047 B2 | 9/2003 | Olechnowicz et al. | |
| 6,648,071 B2 | 11/2003 | Hackworth et al. | |
| 6,682,101 B2 | 1/2004 | Watts | |
| 6,685,236 B2 | 2/2004 | Setterberg, Jr. | |
| 6,708,767 B2 | 3/2004 | Harrall et al. | |
| 6,712,401 B2 | 3/2004 | Coulon et al. | |
| 6,722,443 B1 | 4/2004 | Metcalfe | |
| 6,722,706 B2 | 4/2004 | Church | |
| 6,767,035 B2 | 7/2004 | Hashem | |
| 6,789,822 B1 | 9/2004 | Metcalfe | |
| 6,792,665 B2 | 9/2004 | Baugh et al. | |
| 6,820,698 B2 | 11/2004 | Haynes | |
| 6,896,057 B2 | 5/2005 | Metcalfe | |
| 6,920,932 B2 | 7/2005 | Zimmerman | |
| 6,971,685 B2 | 12/2005 | Hashem | |
| 6,981,547 B2 | 1/2006 | Maguire et al. | |
| 7,011,161 B2 | 3/2006 | Ring et al. | |
| 7,017,950 B2 | 3/2006 | Macaulay | |
| 7,025,135 B2 | 4/2006 | Ellington et al. | |
| 7,077,197 B2 | 7/2006 | Harrall | |
| 7,107,663 B2 | 9/2006 | Ellington et al. | |
| 2002/0027363 A1 | 3/2002 | Mallis et al. | |
| 2002/0175474 A1 | 11/2002 | Simpson et al. | |
| 2004/0017081 A1 | 1/2004 | Simpson et al. | |
| 2004/0055759 A1 | 3/2004 | Sivley, IV | |
| 2004/0135370 A1 | 7/2004 | Evans et al. | |
| 2004/0145184 A1 | 7/2004 | Setterberg, Jr. | |
| 2004/0182569 A1 | 9/2004 | Cook et al. | |
| 2004/0262919 A1 | 12/2004 | Dutilleul et al. | |
| 2005/0023001 A1 | 2/2005 | Hillis | |
| 2005/0029812 A1 | 2/2005 | Metcalfe | |
| 2005/0093250 A1 | 5/2005 | Santi et al. | |
| 2005/0184521 A1 | 8/2005 | Maguire | |
| 2005/0212290 A1 | 9/2005 | Durand et al. | |

FOREIGN PATENT DOCUMENTS

| | | |
|---|---|---|
| EP | 0 171 144 | 2/1986 |
| EP | 0 447 346 | 9/1991 |

| | | |
|---|---|---|
| EP | 0 659 975 | 6/1995 |
| EP | 0 803 637 | 10/1997 |
| EP | 1 106 778 | 6/2001 |
| EP | 1 167 686 | 1/2002 |
| EP | 1 479 959 | 11/2004 |
| FR | 2 742 177 | 6/1997 |
| GB | 706 342 | 3/1954 |
| GB | 1 037 010 | 7/1966 |
| GB | 2 033 942 | 5/1980 |
| GB | 2 099 529 | 12/1982 |
| GB | 2 161 569 | 1/1986 |
| GB | 2 345 308 | 7/2000 |
| GB | 2 345 935 | 7/2000 |
| GB | 2 371 574 | 7/2002 |
| GB | 2404397 | 2/2005 |
| GB | 2 441 204 | 2/2008 |
| JP | 2002-286183 | 10/2002 |
| SU | 1367586 | 11/1996 |
| WO | WO 90/11455 | 10/1990 |
| WO | WO 93/12323 | 6/1993 |
| WO | WO 93/25800 | 12/1993 |
| WO | WO 96/37680 | 11/1996 |
| WO | WO 96/37681 | 11/1996 |
| WO | WO 96/37687 | 11/1996 |
| WO | WO 97/17524 | 5/1997 |
| WO | WO 97/21901 | 6/1997 |
| WO | WO 98/22690 | 5/1998 |
| WO | WO 98/32948 | 7/1998 |
| WO | WO 98/42947 | 10/1998 |
| WO | WO 98/47805 | 10/1998 |
| WO | WO 00/08301 | 2/2000 |
| WO | WO 00/37766 | 6/2000 |
| WO | WO 01/18355 | 3/2001 |
| WO | WO 01/60545 | 8/2001 |
| WO | WO 02/10551 | 2/2002 |
| WO | WO 02/059458 | 8/2002 |
| WO | WO 02/075107 | 9/2002 |
| WO | WO 02/075197 | 9/2002 |
| WO | WO 03/006788 | 1/2003 |
| WO | WO 03/032331 | 4/2003 |
| WO | WO 03/036012 | 5/2003 |
| WO | WO 03/036017 | 5/2003 |
| WO | WO 03/048503 | 6/2003 |
| WO | WO 03/048506 | 6/2003 |
| WO | WO 03/078882 | 9/2003 |
| WO | WO 2005/003511 | 1/2005 |
| WO | WO 2005/106309 | 11/2005 |
| WO | WO 2005/113190 | 12/2005 |

OTHER PUBLICATIONS

Canadian Office Action dated Mar. 25, 2009, Canadian Patent Application No. 2,577,645.
GB Examination Report for GB0702526.5 dated May 28, 2010.
Canadian Office Action for Application No. 2,577,645 dated Jul. 14, 2010.

* cited by examiner

ENERGIZING SEAL FOR EXPANDABLE CONNECTIONS

CROSS-REFERENCE TO RELATED APPLICATIONS

This application claims the benefit of U.S. Provisional Pat. App. No. 60/772,364, filed Feb. 10, 2006, which is hereby incorporated by reference in its entirety.

This application is a continuation in part of co-pending U.S. patent application Ser. No. 10/848,544, filed May 18, 2004, which claims benefit of British Patent application GB 0311721.5, filed May 22, 2003, both of which are herein incorporated by reference in their entireties.

U.S. Pat. Nos. 5,348,095, 5,924,745, and 6,981,547 are herein incorporated by reference in their entireties. U.S. Pat. App. Pub. No. 2002/0175474 is herein incorporated by reference in its entirety. International patent publication No. WO00/37766 is incorporated herein in its entirety.

BACKGROUND OF THE INVENTION

1. Field of the Invention

The present invention relates to a connector for tubing. In particular, but not exclusively, the present invention relates to the sealing of a connector for expandable downhole tubing sections.

2. Description of the Related Art

In the oil and gas exploration and production industry, expandable tubing has been developed and has a variety of uses. These include expandable borehole casing and liner, and expandable sand exclusion based tubing assemblies or sandscreens, such as that sold under the ESS Trademark by Weatherford Int'l.

Expandable tubing offers a number of advantages over conventional borehole tubing, as the expandable tubing can be run into a borehole in an unexpanded state and subsequently expanded downhole. This allows the tubing to be run through existing tubing and then expanded to a larger diameter within the borehole.

There exists a need in the art for an expandable connection which maintains sealing integrity before, during, and after expansion.

SUMMARY OF THE INVENTION

The present invention generally provides a tubular configured to mate with a second tubular so that sealing integrity is maintained between the tubulars before, during, and after expansion of the tubulars. In one embodiment, a connector for connecting tubulars is provided. The connector includes a pin portion; a box portion, wherein the pin and the box portions are configured to mate; a sealing surface formed in an inner surface of the box portion; a seal disposed in a groove formed in an outer surface of the pin portion, wherein the seal is configured to engage with a sealing surface of the box portion upon mating of the pin and the box portions; and a bump formed on an inner surface of the pin portion, wherein the bump is substantially radially aligned with the groove and the bump is configured so that the seal remains engaged with the box portion during and after expansion of the pin and the box portions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1A:
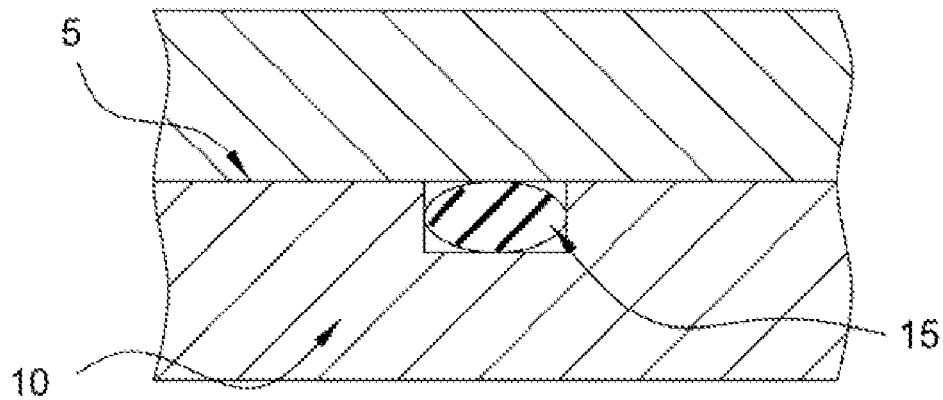
FIG. 1A is a sectional view of a prior art sealing portion of a connection between two expandable tubulars before expansion thereof.
Figure 1B:
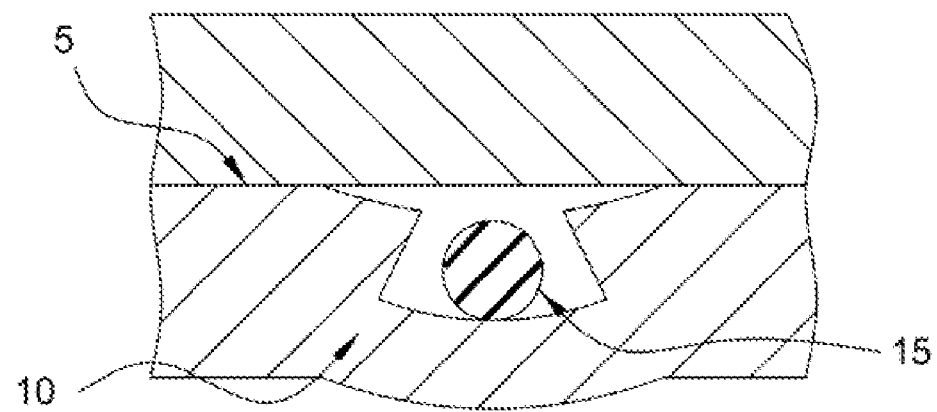
FIG. 1B is a view of the prior art connection of FIG. 1A after expansion.

FIG. 1A is a sectional view of a sealing portion of a connection between two expandable tubulars before expansion thereof. FIG. 1B is a view of the connection of FIG. 1A after expansion. The expandable tubing sections typically include a male threaded portion (pin) 10 and a female threaded portion (box) 5 at opposite ends, for joining adjacent sections of tubing together end to end. The pin 10 and box 5 of adjacent tubing sections thus form connectors for coupling the tubing sections together. The seal 15 shown in FIG. 1A is engaged with the box 5, thereby providing a fluid-tight seal. However, upon expansion of the connection, plastic deformation of the seal-groove area may cause the area to sag as shown in FIG. 1B. The seal 15 then contracts into the sagged base, thereby disengaging from the box.

Disengagement of the seal compromises the sealing integrity of the connection during and after expansion.

Figure 2:
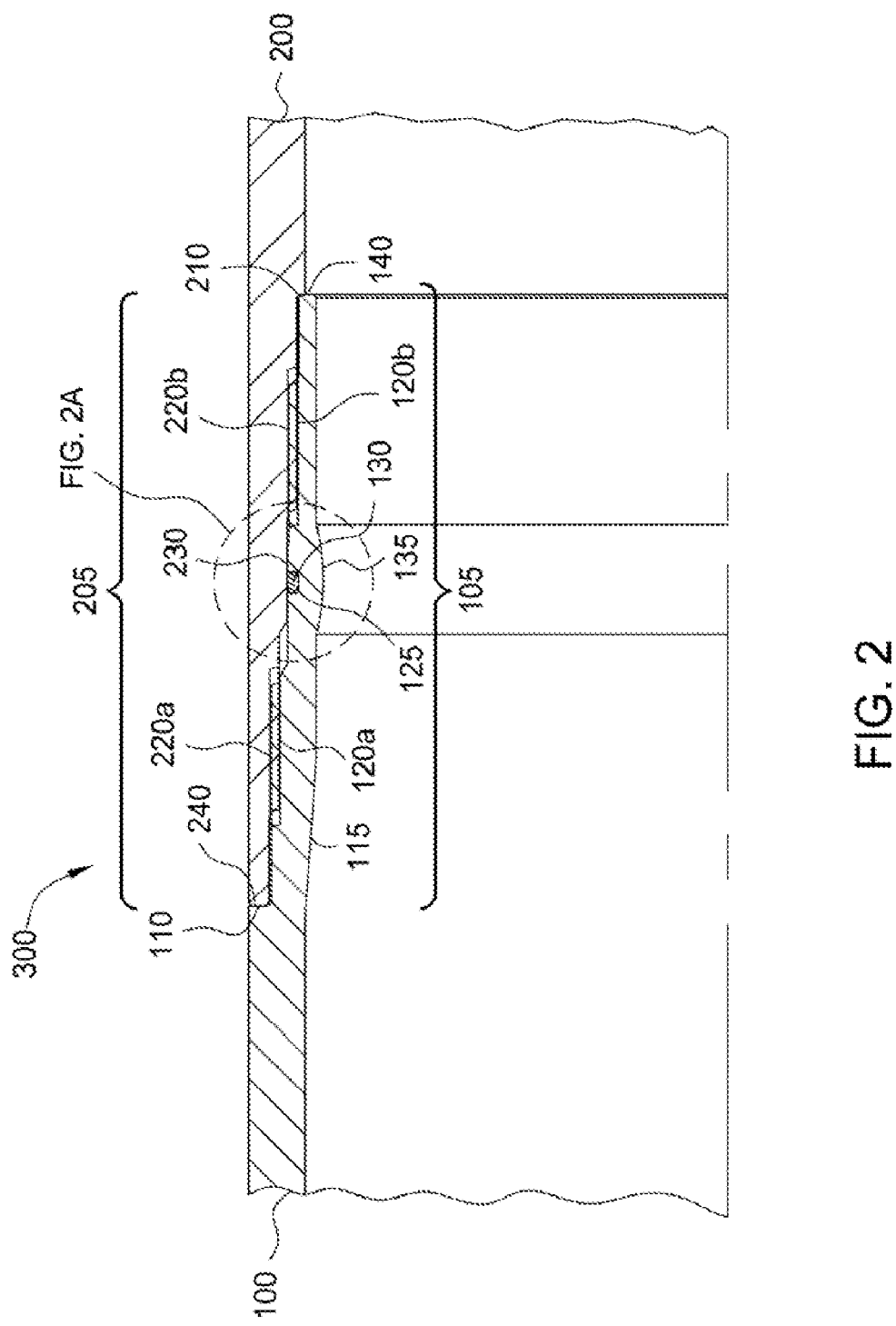
FIG. 2 is a sectional view of the connection between two expandable tubulars, shown prior to expansion.
Figure 2A:
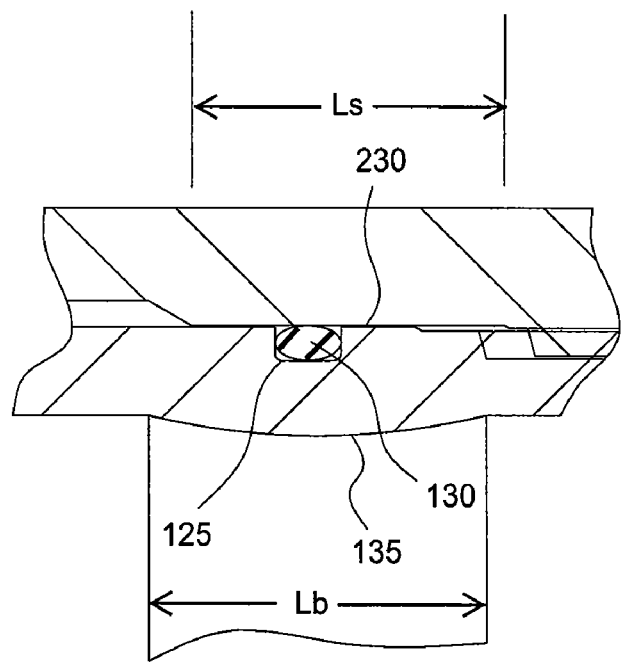
FIG. 2A is an enlargement of a seal portion of FIG. 2.

FIG. 2 a sectional view of a connection 300 between a first expandable tubular 100 and a second expandable tubular 200 prior to expansion. FIG. 2A is an enlargement of a seal portion of FIG. 2. The tubulars 100,200 may be solid or continuous-walled expandable tubing such as casing or liner, as well as other types of expandable tubing, such as slotted tubing and sand exclusion assemblies. The tubulars 100,200 are made of a ductile material capable of sustaining plastic deformation. Preferably, the material is a metal, more preferably steel.

The expandable tubulars 100,200 are mated together at the surface of a wellbore according to normal stab-in and threading procedures to form an expandable tubular string. The stab-in procedures can be performed with tubulars arranged in a pin up and a box down configuration or a configuration with the pin down and the box up. The string of expandable tubulars 100,200 is then run-in into the wellbore to a desired location on a workstring. The workstring may be composed of drill pipe or coiled tubing.

The tubulars 100,200 may be expanded in the wellbore by any known method. When operated, an expansion tool will radially expand the tubulars 100,200 as well as the connector 300 to a larger diameter. The expansion tool may employ a simple cone-shaped body, which is typically run into a wellbore at the bottom of the tubular string that is to be expanded. The expansion tool is then forced upward in the wellbore by applying pressure below the cone and/or pulling on a workstring attached to the cone. A dart may be coupled to the cone to provide sealing engagement with an inner wall of the expandable tubulars. Alternatively, the cone may be forced through the expandable string solely by pulling on the workstring from the surface. Alternatively, the expansion tool may be a rotary expansion tool having pressure actuated rollers. When the expansion tool reaches the connection 300 between the first tubular 100 and the second tubular 200, an internal wall of a pin portion 105 of the first tubular 100 expands into an internal wall of a box portion 205 of the second tubular 200. The connection 300 between the tubulars 100,200 is capable of being expanded without losing its mechanical or sealing integrity.

The connection 300 comprises the pin portion 105 of the first tubular 100 mated or engaged with the box portion 205 of the second tubular. Each expandable tubular comprises a pin and box at opposite longitudinal ends thereof, for coupling a number of tubulars together end to end, to form a string of expandable tubulars. Alternatively, the tubulars 100,200 may have pins at both ends thereof and a coupling (not shown) may have two box ends for assembly of the tubulars 100,200. The pin 105 and the box 205 portions are also made of a ductile material capable of sustaining plastic deformation. Preferably, the material is a metal, more preferably steel. The pin portion 105 includes a shoulder 110, a tapered portion 115, first 120*a* and second 120*b* threaded portions, a groove 125, a seal 130, a bump 135, and an end 140. The box portion 205 includes a shoulder 210, first 220*a* and second 220*b* threaded portions, a sealing surface 230, and an end 240.

A two-step thread is illustrated comprising thread pairs 120*a*,220*a* and 120*b*,220*b*, which are spaced apart to allow the placement of the seal 130. Upon makeup, the box end 240 abuts the shoulder 110 formed in the pin 105. A small gap may exist between the shoulder 210 and the pin end 140. Alternatively, the connection may be configured so that the shoulder 210 and the pin end 140 also abut. Alternatively, a single or multi-step thread or other ways to connect the pin 105 to the box 205 are within the scope of the invention. For example, the connection could be a bayonet type involving pushing the pin into the box and relatively rotating them into a made up position, prior to expansion downhole. A wide variety of thread forms can also be used in the connection of the present invention. Alternatively, the pin may include a recess in the form of a helical groove, and the box may include a corresponding helical groove. The grooves align on mating the pin and box at surface to define a continuous cavity, and a connector in the form of a wire is located in the cavity to lock the pin and box together.

The pin 105 and box 205 may be formed integrally with the respective tubulars 100,200. Alternatively, the pin 105 may be a cylindrical body or sub which is welded to the end of the tubular 100. In a similar fashion, the box 205 may be a short sub which is welded to the tubular 200.

The seal 130 is disposed in the groove 125 formed in an outer surface of the pin 105 between the threaded portions 120*a,b*. Preferably, the seal is an elastomer o-ring. As used herein, the term elastomer includes natural and synthetic rubber. Alternatively, the seal may be made of a composite material, a fluoro-carbon, or metal. Alternatively, the cross-sectional shape of the seal may be rectangular, square, any other polygon shape, or elliptical.

Disposing the seal 130 between the threaded portions 120*a,b* protects the seal from damage during service and/or make-up. Alternatively, the seal may be disposed at any longitudinal location along the pin 105. During make-up, the seal is energized by contact with the sealing surface 230 of the box 205 so that sealing integrity is provided during run-in and expansion. Disposing the seal 130 onto the pin 105 instead of within the box 205 is advantageous in that the seal 130 is in tension upon insertion into the groove 125. Being in tension protects the seal 130 from being sheared, clipped, or even dislodged during make-up of the pin 105 and the box 205. Further, any issue of aligning the bump 135 and the seal 130 during makeup is eliminated. Alternatively and less preferably, the seal may be disposed within the box portion. The bump 135 would then be substantially radially aligned with the sealing surface, which would be instead located on the pin.

The bump 135 is formed on an inner surface of the pin 105 in substantial radial alignment with the groove 125. A length Lb of the bump 135 may correspond to a length Ls of the sealing surface 230. The bump serves to maintain integrity of the seal 130 during and after expansion, discussed in detail below. The bump 135 may either be formed on the inner surface of the pin 105 by machining or may be added to the inner surface by bonding a separate piece or welding. If the bump is added, it may be made from a material different than the pin 105. Preferably, the cross-sectional shape of the bump 135 is substantially a segment of a circle. Alternatively, the cross sectional shape of the bump 135 is substantially a sector of a circle, semi-circular, semi-elliptical, trapezoidal, semi-trapezoidal, triangular, any polygon, or any portions of these shapes.

Figure 2B:
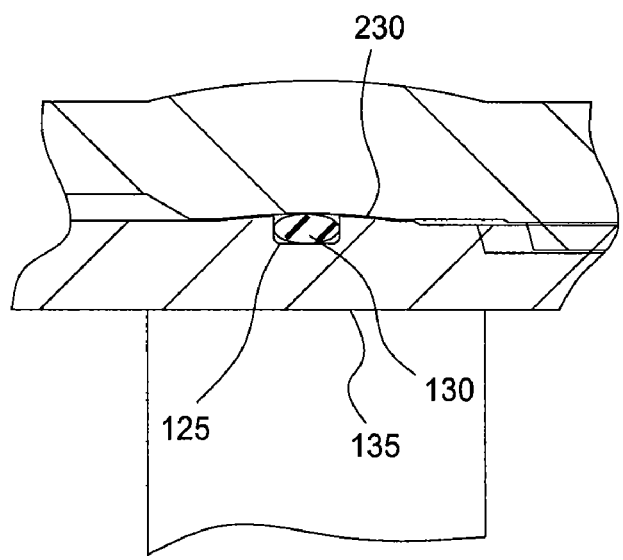
FIG. 2B is a view of FIG. 2A after expansion.
Figure 3A:
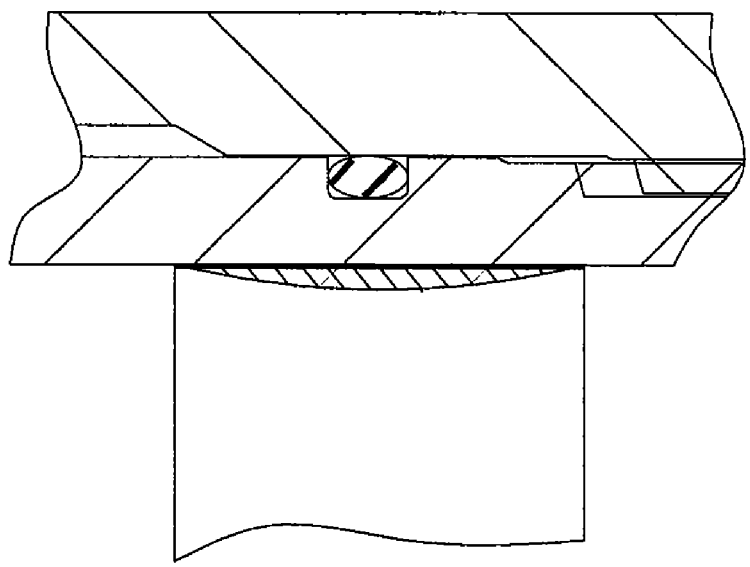
FIG. 3A is a sectional view of an alternative pin having a bump welded thereto.
Figure 3B:
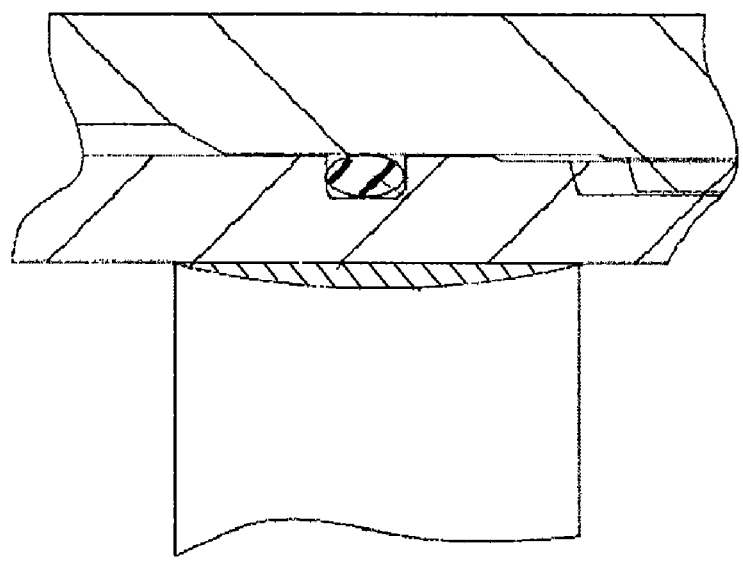
FIG. 3B is a sectional view of an alternative pin having a bump bonded thereto.
Figure 3C:
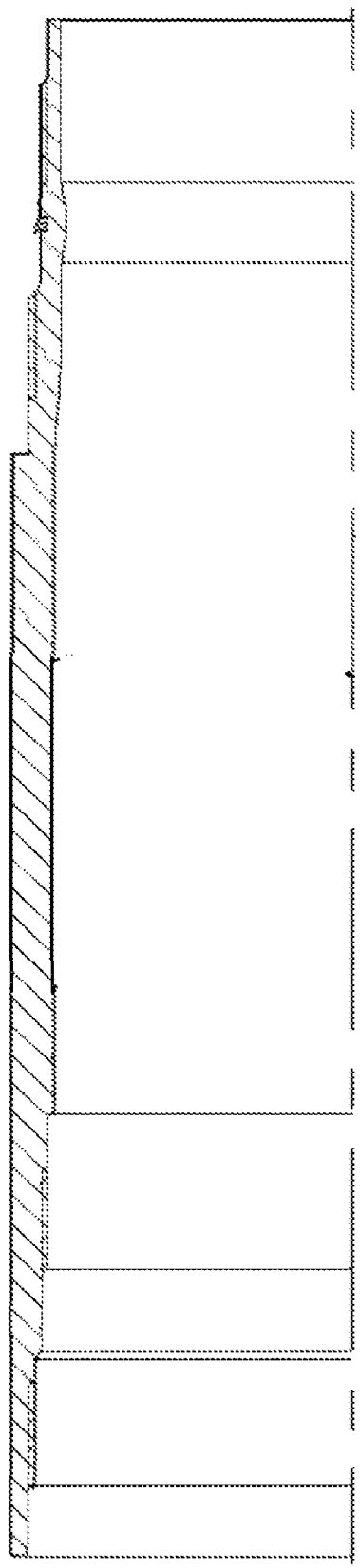
FIG. 3C is a sectional view of a tubular having a pin and box disposed at opposite ends thereof.
Figure 3D:
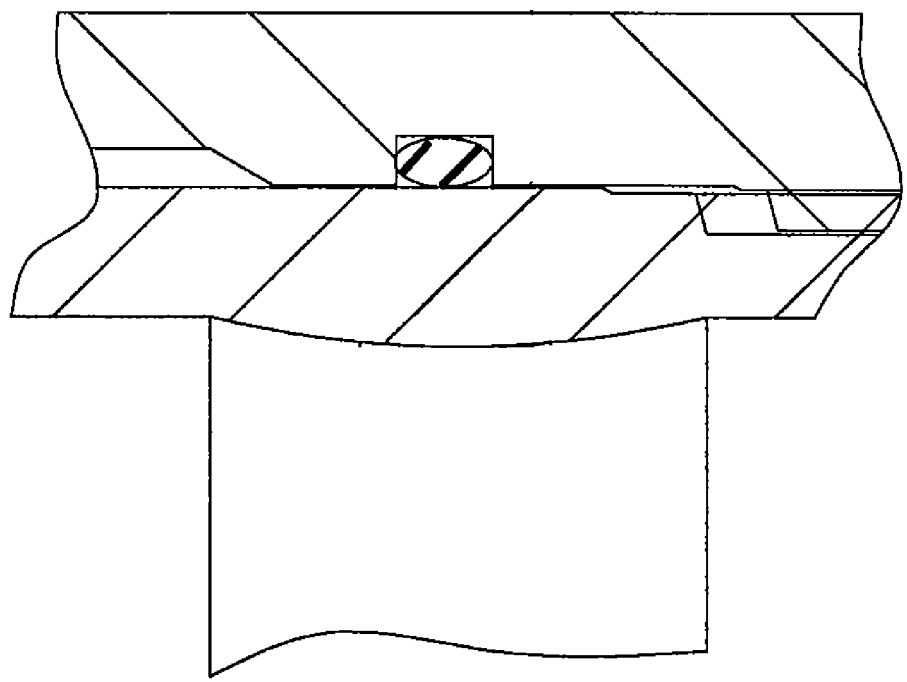
FIG. 3D is a sectional view of an alternative connection having the seal disposed along an inner surface of the box.

FIG. 2B is a view of FIG. 2A after expansion. During expansion, the bump 135 maintains sealing engagement with the box 205 as follows. When the expansion tool passes down through the connector 300, the bump 135, or at least a substantial portion thereof, is displaced radially outwardly. This movement actually deforms the groove area 125 radially outwardly as shown in FIG. 2B. This expansion not only maintains the engagement of the seal 130 with the sealing surface 230 of the box 205 but actually increases force exerted on the seal 130 by the base of the groove. This sealing engagement is maintained, and even improved, after removal of the expansion forces and thus prevents fluid ingress or egress through the connection 300 between the pin 105 and the box 205. Accordingly, no undesired fluid or solids can enter the string of expanded tubulars through the connectors 300, and no fluid or solids can escape from the expanded tubulars through the connectors 300. A small portion of the bump 135 may remain after expansion.

While the foregoing is directed to embodiments of the present invention, other and further embodiments of the invention may be devised without departing from the basic scope thereof, and the scope thereof is determined by the claims that follow.

What is claimed is:

1. A connector for connecting tubulars, comprising:
   a first tubular having a pin and two threads formed on an outer surface of the pin;
   a coupling or second tubular having a box and two threads formed on an inner surface of the box, wherein the pin and the box are configured to mate;
   a sealing surface formed in an inner surface of the box between the two box threads;
   a seal disposed in a groove formed in an outer surface of the pin between the two pin threads, wherein the seal is configured to engage with the sealing surface upon mating of the pin and the box; and
   a bump formed on an inner surface of the pin, wherein the bump is substantially radially aligned with the groove and the bump is configured so that the seal remains engaged with the box during and after expansion of the pin and the box, wherein a length of the bump corresponds to a length of the sealing surface.

2. The connector of claim 1, wherein a cross sectional shape of the bump is substantially a segment of a circle.

3. The connector of claim 1, wherein a cross sectional shape of the bump is substantially semi-circular or semi-elliptical.

4. The connector of claim 1, wherein the bump is formed integrally with the pin.

5. The connector of claim 1, wherein the bump is bonded to the pin.

6. The connector of claim 5, wherein the bump is made from a different material than the pin.

7. The connector of claim 1, wherein the bump is a weld.

8. The connector of claim 1, wherein the connector comprises the second tubular and each tubular has a pin and box located at respective longitudinal ends thereof.

9. The connector of claim 1, further comprising a shoulder formed in the pin, wherein the pin and the box are configured so an end of the box abuts the shoulder of the pin upon mating of the pin and the box.

10. The connector of claim 9, wherein an inner surface of the pin tapers proximate to a longitudinal location of the shoulder of the pin.

11. The connector of claim 1, wherein the seal is made from an elastomer.

12. The connector of claim 1, wherein the seal is an o-ring.

13. The connector of claim 1, wherein the pin and the box are made from metal.

14. A method for installing a tubular string in a wellbore, comprising:
   running a tubular string into the wellbore, the tubular string comprising the first tubular of claim 1 connected to the second tubular having the box or two first tubulars of claim 1 each connected to the coupling; and
   radially expanding the tubular string in the wellbore.

15. A connector for connecting tubulars, comprising:
   a pin portion;
   a box portion, wherein the pin and the box portions are configured to mate;
   a sealing surface formed in an outer surface of the pin portion;
   a seal disposed in a groove formed in an inner surface of the box portion, wherein the seal is configured to engage with the sealing surface upon mating of the pin and the box portions; and
   a bump formed on an inner surface of the pin portion, wherein the bump is substantially radially aligned with the sealing surface and the bump is configured so that the seal remains engaged with the pin portion during and after expansion of the tubulars,
   wherein a length of the bump corresponds to a length of the sealing surface.

16. The connector of claim 15, wherein a cross sectional shape of the bump is substantially a segment of a circle.

17. The connector of claim 15, wherein a cross sectional shape of the bump is substantially semi-elliptical or semi-circular.

18. The connector of claim 15, wherein the bump is formed integrally with the pin.

19. The connector of claim 15, wherein the bump is bonded to the pin.

20. The connector of claim 19, wherein the bump is made from a different material than the pin.

21. The connector of claim 15, wherein the bump is a weld.

22. The connector of claim 15, further comprising a thread formed on an outer surface of the pin portion and a thread formed on an inner surface of the box portion.

23. The connector of claim 15, further comprising two threads formed on an outer surface of the pin portion and two threads formed on an inner surface of the box portion, wherein the groove is disposed between the two threads of the box portion.

24. The connector of claim 15, further comprising a shoulder formed in the pin portion, wherein the pin and the box portions are configured so an end of the box portion abuts the shoulder of the pin portion upon mating of the pin and the box portions.

25. The connector of claim 24, wherein an inner surface of the pin portion tapers proximate to a longitudinal location of the shoulder of the pin portion.

26. The connector of claim 15, wherein the seal is made from an elastomer.

27. The connector of claim 15, wherein the seal is an o-ring.

28. The connector of claim 15, wherein the pin and the box portions are made from metal.

29. A method for installing a tubular string in a wellbore, comprising:
   running a tubular string into the wellbore, the tubular string comprising a plurality of tubulars, each tubular connected using the connector of claim 15; and
   radially expanding the tubular string in the wellbore.

30. A tubular for use in a wellbore, comprising:
   a tubular body having a wall, a longitudinal bore, a pin located at a first longitudinal end thereof, and a box located at a second longitudinal end thereof;
   two threads formed on an outer surface of the pin;
   two threads formed on an inner surface of the box;
   a sealing surface formed in an inner surface of the box between the two box threads;
   a seal disposed in a groove formed in an outer surface of the pin between the two pin threads; and
   a bump formed on an inner surface of the pin,
   wherein:
      the bump is substantially radially aligned with the groove, and
      a length of the bump corresponds to a length of the sealing surface.

31. A method for installing a tubular string in a wellbore, comprising:
   running a tubular string into the wellbore, the tubular string comprising a plurality of tubulars of claim 30, the pin of a first one of the tubulars connected to the box of an adjacent second one of the tubulars; and
   radially expanding the tubular string in the wellbore, wherein expansion of the bump maintains engagement of the seal with the sealing surface.

32. The tubular of claim 30, wherein the body is made from a ductile material capable of sustaining plastic deformation.

33. A connector for connecting tubulars, comprising:
   a pin portion;
   a box portion, wherein the pin and the box portions are configured to mate;
   a sealing surface formed in an inner surface of the box portion;
   a seal disposed in a groove formed in an outer surface of the pin portion, wherein the seal is configured to engage with the sealing surface upon mating of the pin and the box portions; and
   a bump formed on an inner surface of the pin portion, wherein the bump is substantially radially aligned with the groove and the bump is configured so that the seal remains engaged with the box portion during and after expansion of the pin and the box portions,
wherein the bump is a weld.

34. The connector of claim 33, wherein a length of the bump corresponds to a length of the sealing surface.

35. A connector for connecting tubulars, comprising:
a pin portion;
a box portion, wherein the pin and the box portions are configured to mate;
a sealing surface formed in an outer surface of the pin portion;
a seal disposed in a groove formed in an inner surface of the box portion, wherein the seal is configured to engage with the sealing surface upon mating of the pin and the box portions; and
a bump formed on an inner surface of the pin portion, wherein the bump is substantially radially aligned with the sealing surface and the bump is configured so that the seal remains engaged with the pin portion during and after expansion of the tubulars,
wherein the bump is a weld.

36. A connector for connecting tubulars, comprising:
a pin portion;
a box portion, wherein the pin and the box portions are configured to mate;
a sealing surface formed in an outer surface of the pin portion;
a seal disposed in a groove formed in an inner surface of the box portion, wherein the seal is configured to engage with the sealing surface upon mating of the pin and the box portions;
a bump formed on an inner surface of the pin portion, wherein the bump is substantially radially aligned with the sealing surface and the bump is configured so that the seal remains engaged with the pin portion during and after expansion of the tubulars; and
two threads formed on an outer surface of the pin portion and two threads formed on an inner surface of the box portion, wherein the groove is disposed between the two threads of the box portion.

* * * * *

UNITED STATES PATENT AND TRADEMARK OFFICE
CERTIFICATE OF CORRECTION

| | |
|---|---|
| PATENT NO. | : 7,887,103 B2 |
| APPLICATION NO. | : 11/672180 |
| DATED | : February 15, 2011 |
| INVENTOR(S) | : Evans et al. |

It is certified that error appears in the above-identified patent and that said Letters Patent is hereby corrected as shown below:

<u>Title Page, Item (73) Assignee:</u>

Please delete "Watherford/Lamb" and insert --Weatherford/Lamb-- therefor.

Signed and Sealed this
Twenty-second Day of March, 2011

David J. Kappos
*Director of the United States Patent and Trademark Office*